UNITED STATES PATENT OFFICE.

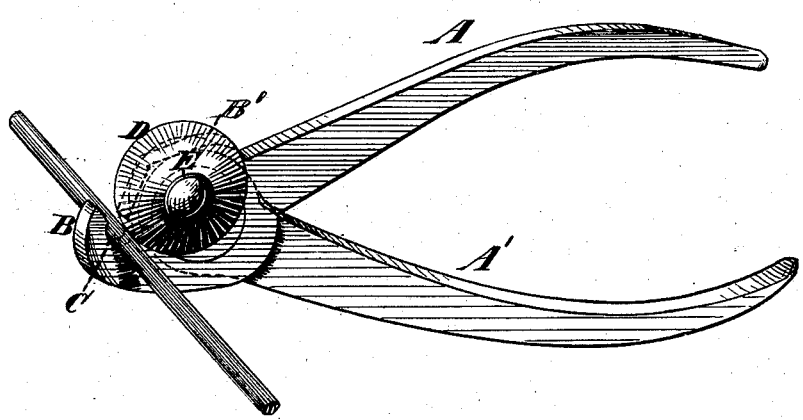
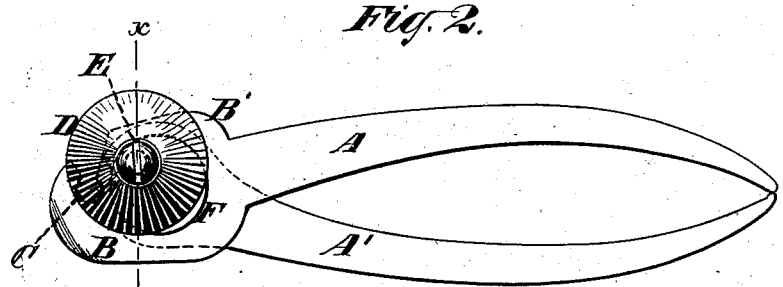
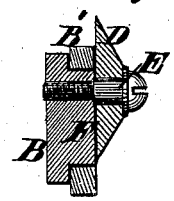

CHARLES M. KNOWLES, OF NEW LONDON, CONNECTICUT.

IMPROVEMENT IN WIRE-CUTTING TOOLS.

Specification forming part of Letters Patent No. 205,103, dated June 18, 1878; application filed March 25, 1878.

*To all whom it may concern:*

Be it known that I, CHARLES M. KNOWLES, of New London, in the county of New London and State of Connecticut, have invented an Improvement in Implements for Cutting Wire; and I do hereby declare that the following is a full, clear, and exact description of the same, reference being had to the accompanying drawing, forming part of this specification.

My invention has for its object the production of a cheap and far more durable wire-cutter than has heretofore been supplied to the trade.

The invention consists in the combination, with the pivoted parts, jaws, or levers of a wire-cutting implement, of a rotary cutter pivoted to one of the said parts, jaws, or levers, the pivot of said cutter and an eccentric or circular projection formed on or attached to one of the said pivoted parts, jaws, or levers, and forming a pivot for the other part, as hereinafter described.

Figure 1 in the drawing is a perspective view of an implement for cutting wire constructed in accordance with my invention. Fig. 2 is a side view of the same. Fig. 3 is a section made on the line $x\ x$ in Fig. 2.

A and A' represent two parts or levers of a wire-cutting implement, pivoted together, as hereinafter described, and provided with jaws B and B'.

The jaw B has formed therein a notch, C, for supporting the wire to be cut.

To the other jaw, B', is pivoted a rotary cutter, D, preferably by a screw-pivot, E. The said rotary cutter is made with a beveled edge extending entirely around its circumference.

Formed on or attached to one of the parts A A' is an eccentric, F—that is to say, a circular projection eccentric to the screw-pivot E, which circular projection forms a pivot for the other part. This construction and arrangement causes the cutter to approach the wire more gradually—that is to say, the levers A A' move through a greater distance to cause the cutter to approach or enter the wire a given distance; hence the purchase of the cutter on the wire to be cut is very much increased.

I claim—

The combination, with the pivoted parts, jaws, or levers of a wire-cutting implement, of the rotary cutter D, its pivot E, and the eccentric F, or circular projection eccentric to the pivot E, formed on or attached to one of said pivoted parts, jaws, or levers, and forming a pivot for the other, substantially as and for the purpose specified.

CHARLES M. KNOWLES.

Witnesses:
 J. T. PAGE,
 J. N. KNOWLES.